United States Patent
Shimizu et al.

[11] Patent Number: 6,006,853
[45] Date of Patent: Dec. 28, 1999

[54] CABLE-TYPE STEERING DEVICE

[75] Inventors: Yasuo Shimizu; Hiroshi Tabata, both of Wako, Japan

[73] Assignee: Honda Giken Kogyo Kabushiki Kaisha, Tokyo, Japan

[21] Appl. No.: 08/917,595

[22] Filed: Aug. 26, 1997

[30] Foreign Application Priority Data

Aug. 28, 1996 [JP] Japan .................................. 8-226476

[51] Int. Cl.⁶ .................................................. B62D 5/083
[52] U.S. Cl. .......................... 180/444; 280/771; 74/502.6
[58] Field of Search .................................. 180/400, 443, 180/444, 445, 446, 417; 280/771, 774; 74/500.5, 502.2, 501.6, 502.6; 24/71 CT; 403/56, 292

[56] References Cited

U.S. PATENT DOCUMENTS

| | | | |
|---|---|---|---|
| 1,692,666 | 11/1928 | Koons | 74/500.5 |
| 5,575,180 | 11/1996 | Simon | 74/502.4 |
| 5,598,897 | 2/1997 | Sugiura | 180/417 |
| 5,669,267 | 9/1997 | Ross et al. | 74/502.6 |
| 5,846,015 | 12/1998 | Mononen | 403/56 |
| 5,857,386 | 1/1999 | Ruhlman | 74/502.4 |

FOREIGN PATENT DOCUMENTS 8-2431   1/1996   Japan .

*Primary Examiner*—Kevin Hurley
*Attorney, Agent, or Firm*—Armstrong, Westerman, Hattori, McLeland, & Naughton

[57] ABSTRACT

To facilitate the assembly of wires for connecting a steering wheel and a gear box to each other, and to facilitate the regulation of neutral positions of the steering wheel and the gear box, first Bowden wires connected at one end to a steering wheel and second Bowden wires connected at one end to a gear box are connected at their other ends to each other in an intermediate interlocking device mounted between the steering wheel and the gear box. The intermediate interlocking device includes a first housing in which an intermediate follower pulley with the first Bowden wires wound therearound is accommodated, and a second housing in which an intermediate driving pulley with the second Bowden wires wound therearound is accommodated. If the housings are coupled to each other with a partition wall interposed therebetween, the pulleys are spline-coupled to each other at a predetermined phase.

10 Claims, 9 Drawing Sheets

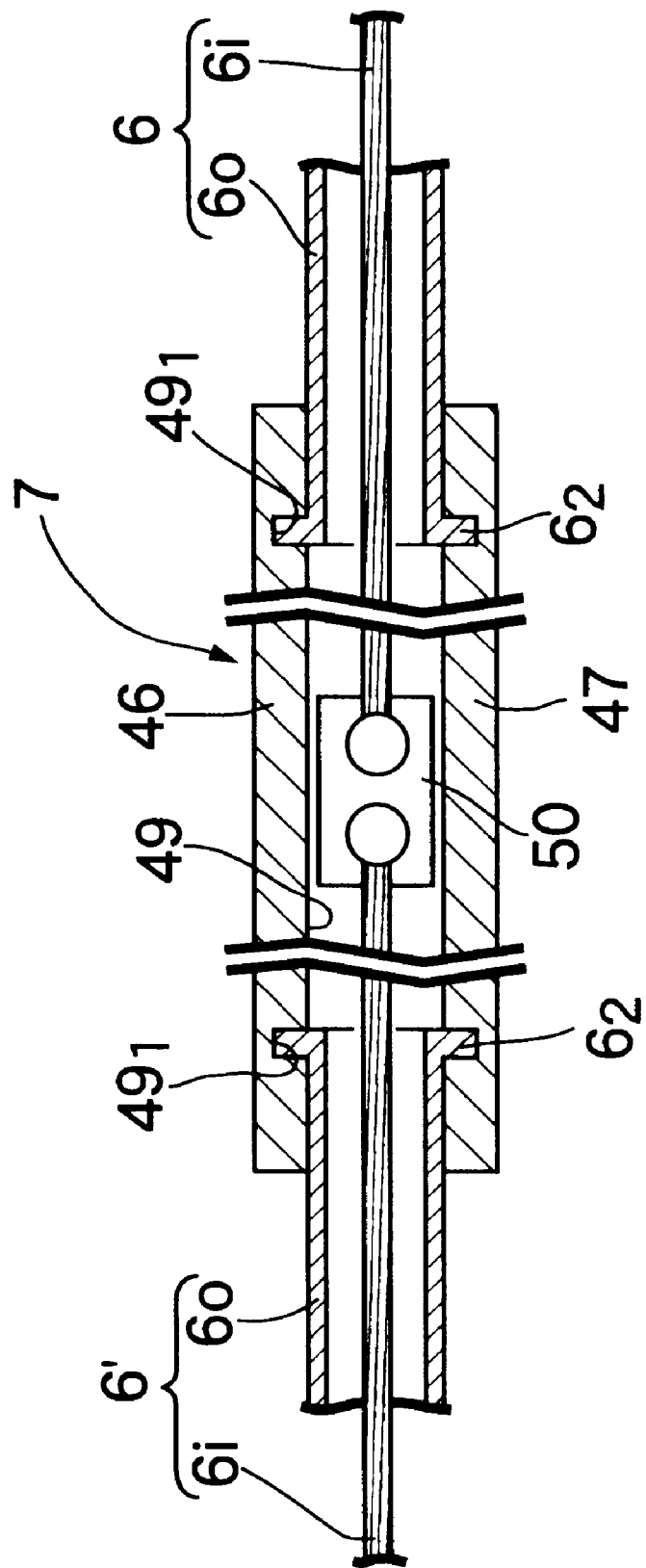

CABLE-TYPE STEERING DEVICE

BACKGROUND OF THE INVENTION

1. Field of the Invention

The present invention relates to a cable-type steering device, including a wire driving means connected to a steering wheel, and a wire follower means connected to a gear box for steering vehicle wheels, the wire driving means and the wire follower means being connected to each other by wires, so that a steering torque inputted to the steering wheel is transmitted to the gear box through the wires.

2. Description of the Related Art

In a conventional steering device for a vehicle, a steering shaft having a steering wheel at an upper end thereof is connected at its lower end to the gear box, so that the steering torque inputted to the steering wheel is transmitted through the steering shaft to a rack and pinion mechanism which is mounted within the gear box.

However, if the steering wheel and the gear box are connected to each other using the steering shaft, it is difficult to freely select the position of the steering wheel relative to the position of the gear box. For this reason, there is a problem in that the degree of design freedom is substantially limited. Also, the gear box cannot be commonly used in a right-hand steered vehicle and a left-hand steered vehicle. Moreover, another problem is that the vibration encountered by a tire from a road surface and the vibration of an engine are transferred to the steering wheel through the steering shaft and hence, the silence within a vehicle compartment and the riding comfort of the vehicle are impeded by such vibrations.

Therefore, there is a proposed cable-type steering device which employs a flexible transmitting means such as Bowden wire and the like, in place of the conventional steering shaft (see Japanese Patent Application Laid-open No.8-2431).

If the construction of the proposed cable-type steering device is used, the position of the steering wheel relative to the position of the gear box can be freely selected and moreover, the vibration of the gear box is difficult to be transmitted to the steering wheel and hence, the above-described problems can be solved.

However, in the conventional art, a partition wall forming a rear wall of an engine room is interposed between a pulley mounted on a rotary shaft of the steering wheel and a pulley mounted on a rotary shaft of the gear box. For this reason, it is necessary to mount the wires for interconnecting both of the pulleys, so that the wires are passed through the partition wall, and the assembly of the wires is troublesome. Moreover, the conventional steering device suffers from a problem in that it is necessary to simultaneously regulate the neutral position of the steering wheel mounted on the side of the vehicle compartment and the neutral position of the gear box on the side of the engine room from both of a vehicle compartment and an engine room in order to match both the neutral positions with each other, and the operation for such regulation is inferior.

SUMMARY OF THE INVENTION

The present invention has been accomplished in view of the above circumstances, and it is an object of the present invention to facilitate the handling of the wires for connecting the steering wheel and the gear box and to facilitate the regulation of the neutral positions.

Objects of the present invention are achieved by providing a cable-type steering device comprising a wire driving means connected to a steering wheel, and a wire follower means connected to a gear box for steering vehicle wheels, said wire driving means and said wire follower means being connected to each other by wires, so that a steering torque inputted to the steering wheel is transmitted to said gear box through said wires, wherein the first wires connected at one of their ends to said wire driving means and the second wires connected at one of their ends to said wire follower means are connected at each of their respective other ends to each other through an intermediate interlocking means which is mounted between said steering wheel and said gear box.

According to one aspect of the present invention, the wire driving means connected to the steering wheel and the intermediate interlocking means are connected to each other by the first wires, and the wire follower means connected to the gear box and the intermediate interlocking means are connected to each other by the second wires. Therefore, the operation of the steering wheel is transmitted through the first wires, the intermediate interlocking means and the second wires to the gear box. The assembly of the first wires and the second wires can be performed separately on the side of the steering wheel and on the side of the gear box and hence, even in the case where a partition wall exists between the steering wheel and the gear box, the assembly of the first wires and the second wires can be performed without a hindrance.

Objects of the present invention are also achieved by providing a cable-type steering device as described above, wherein said intermediate interlocking means includes an intermediate wire follower means and an intermediate wire driving means which are capable of being coupled to and separated from each other, and the other end of each of the first wires are connected to said intermediate wire follower means, while the other end of each of the second wires are connected to said intermediate wire driving means.

According to a second aspect of the invention, if the other end of each of the first wires is previously connected to the intermediate wire follower means, and the other end of each of the second wires is previously connected to the intermediate wire driving means and then, the intermediate wire follower means and the intermediate wire driving means are integrally connected, a driving force transmitting system is established between the steering wheel and the gear box.

The cable-type steering device may further include coupling means for coupling said intermediate wire follower means and said intermediate wire driving means to each other at a fixed phase.

According to a third aspect of the present invention, the intermediate wire follower means and the intermediate wire driving means are coupled to each other at a fixed phase and therefore, the neutral position of the steering wheel and the neutral position of the gear box can be matched with each other.

The cable-type steering device may further include coupling means for coupling said intermediate wire follower means and said intermediate wire driving means to each other at any phase.

According to a fourth aspect of the present invention, the intermediate wire follower means and the intermediate wire driving means are coupled to each other at any phase and therefore, the neutral position of the steering wheel and the neutral position of the gear box can be finely regulated so that they are matched with each other.

In addition, the effective radius of the intermediate wire follower means from its rotational center to the first wires is different from the effective radius of the intermediate wire driving means from its rotational center to the second wires.

According to a fifth aspect of the present invention, the displacement of the second wires relative to the displacement of the first wires is varied depending upon the ratio of the effective radius of the intermediate wire follower means and the effective radius of the intermediate driving means. Therefore, the amount of gear box operated relative to the amount of steering wheel operated can be varied to any value by setting the ratio of the effective radius at a predetermined value.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 9 is an enlarged sectional view taken along a line 9—9 in FIG. 8.

DETAILED DESCRIPTION OF THE PREFERRED EMBODIMENTS

Figure 1:
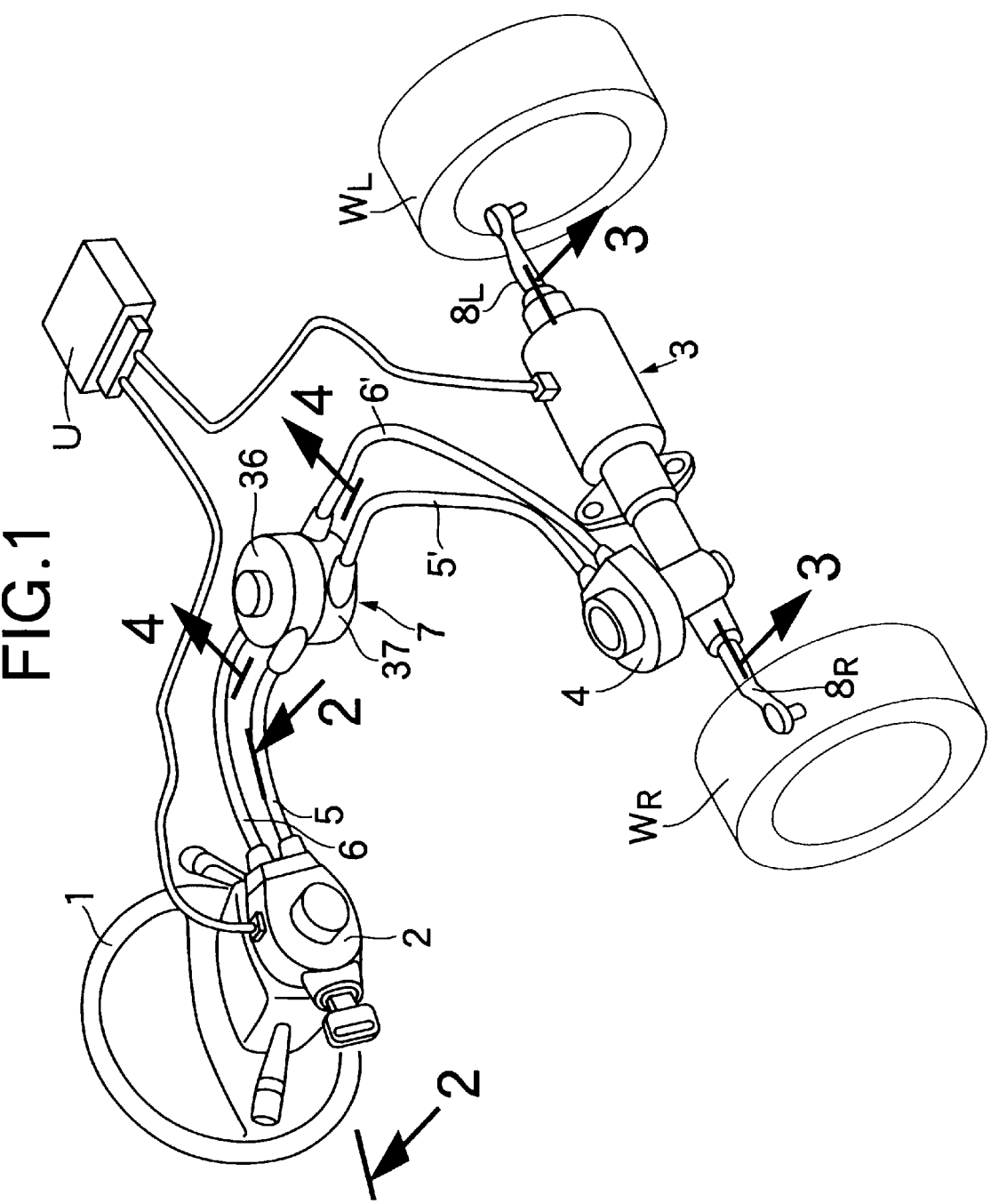
FIG. 1 is a perspective view of a steering device for a vehicle according to a first embodiment of the invention.

Reference will now be made in detail to the preferred embodiments of the present invention, examples of which are illustrated in the accompanying drawings FIGS. 1 to 6, wherein like reference numerals refer to like elements throughout.

Figure 2:
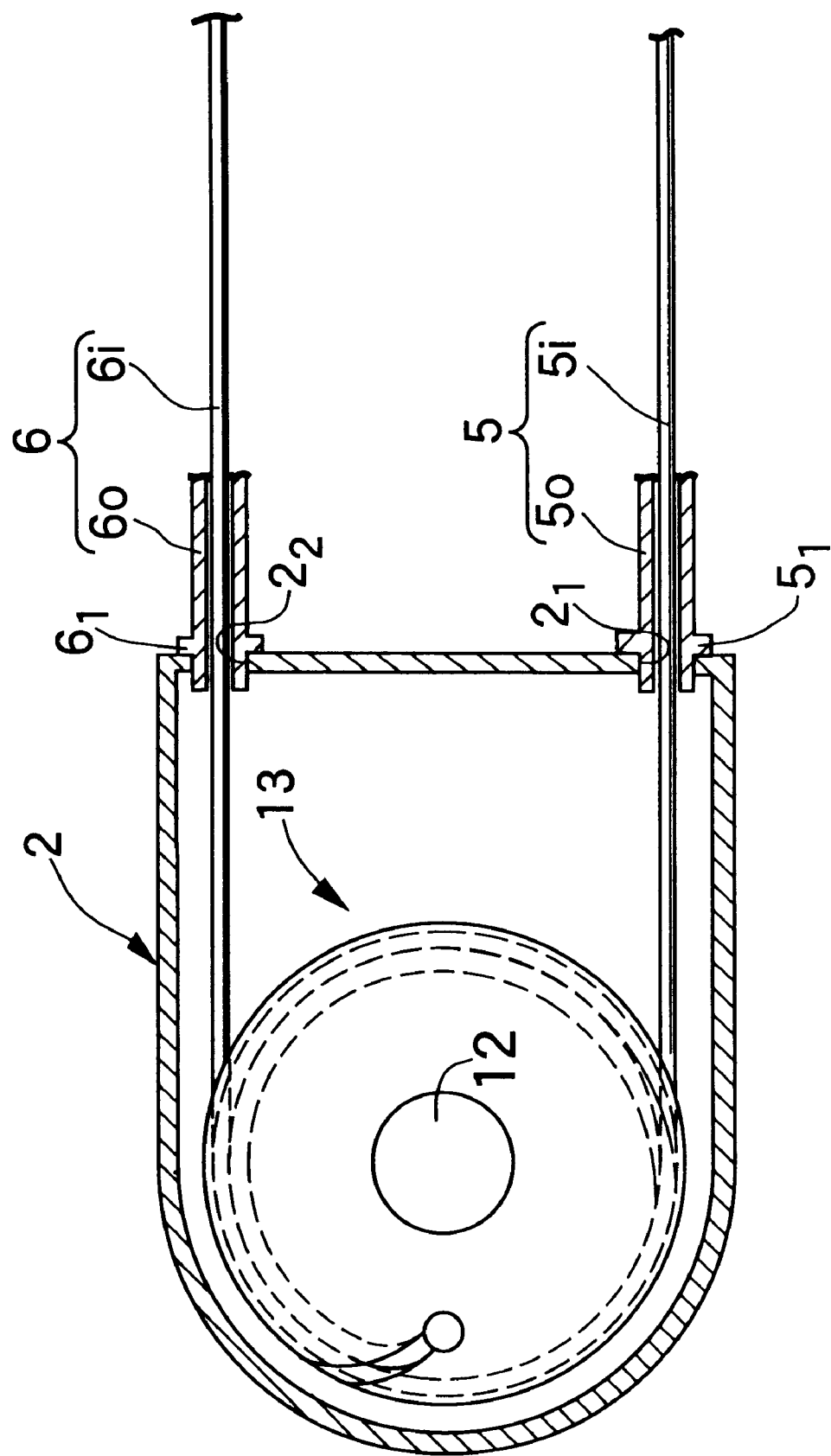
FIG. 2 is an enlarged sectional view taken along a line 2—2 in FIG. 1.
Figure 3:
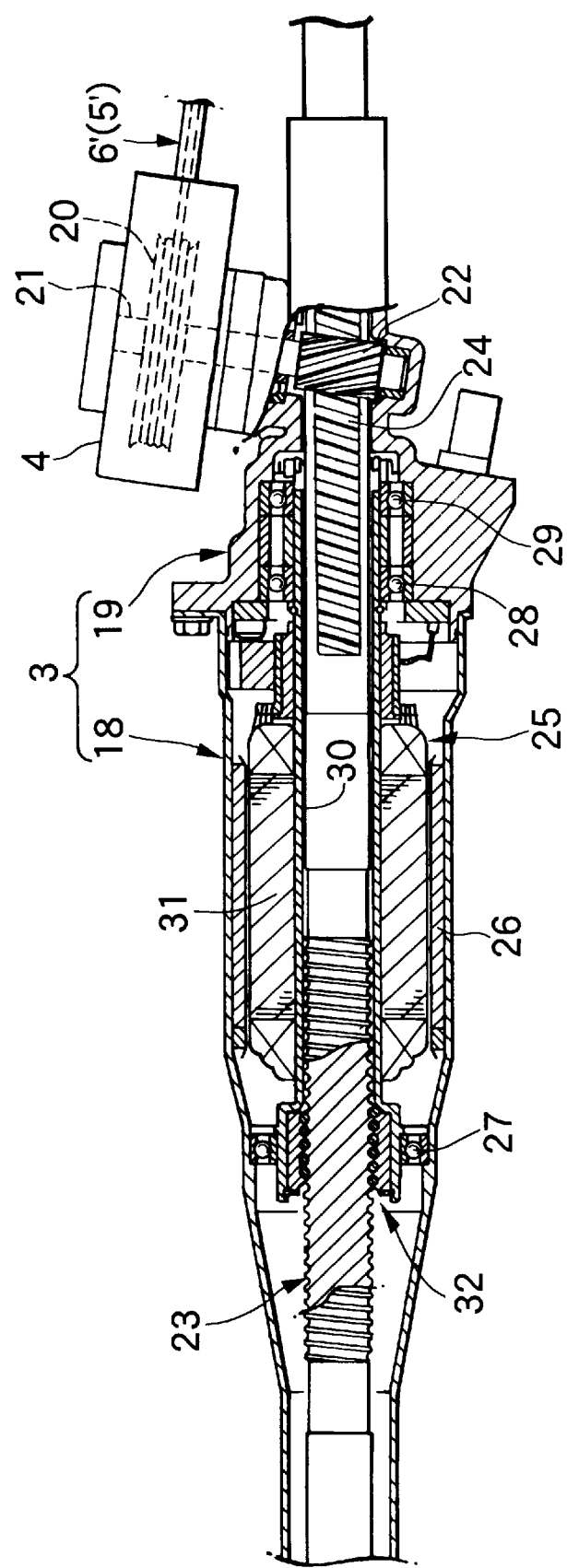
FIG. 3 is an enlarged sectional view taken along a line 3—3 in FIG. 1.
Figure 4:
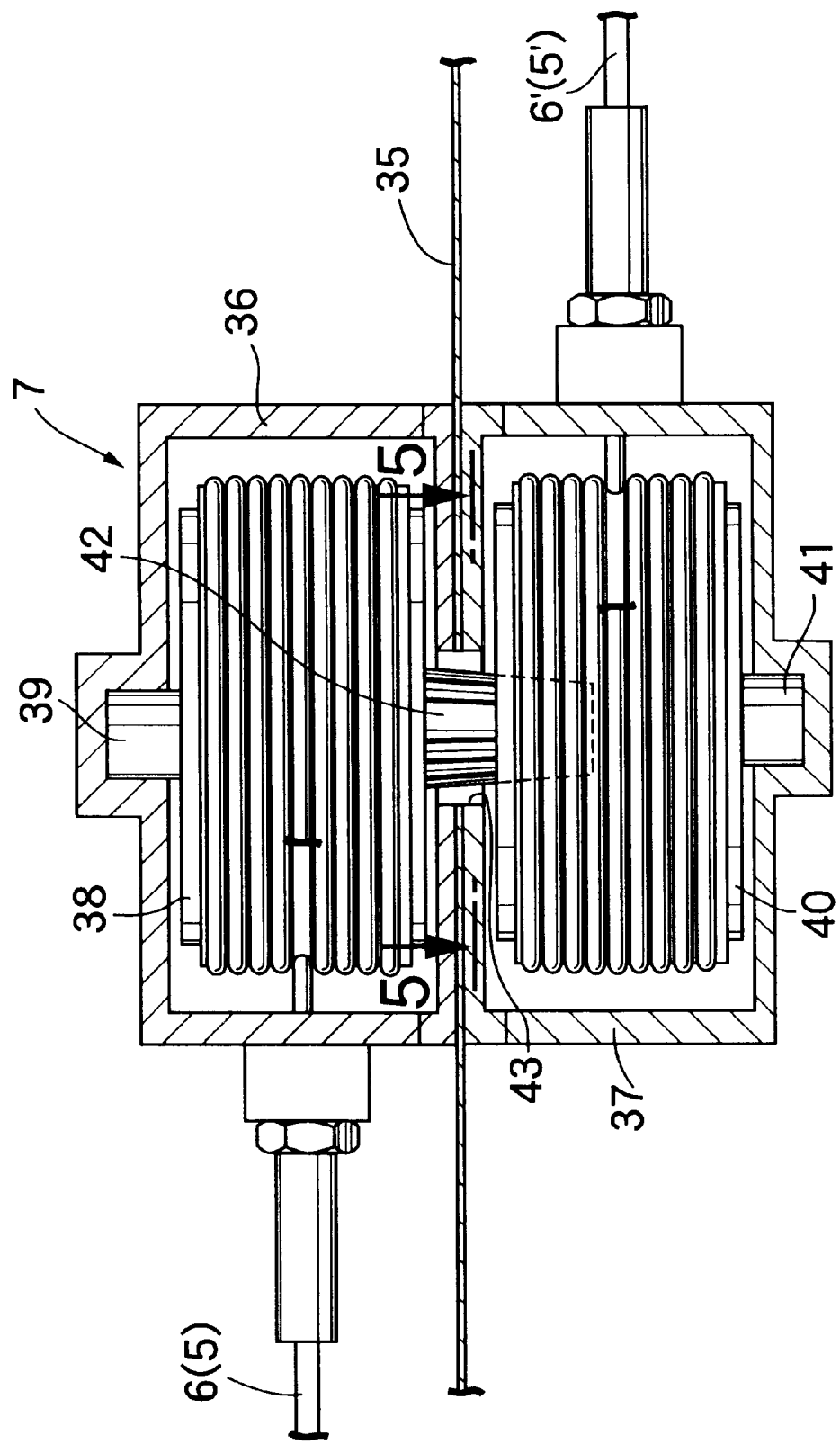
FIG. 4 is an enlarged sectional view taken along a line 4—4 in FIG. 1.
Figure 5:
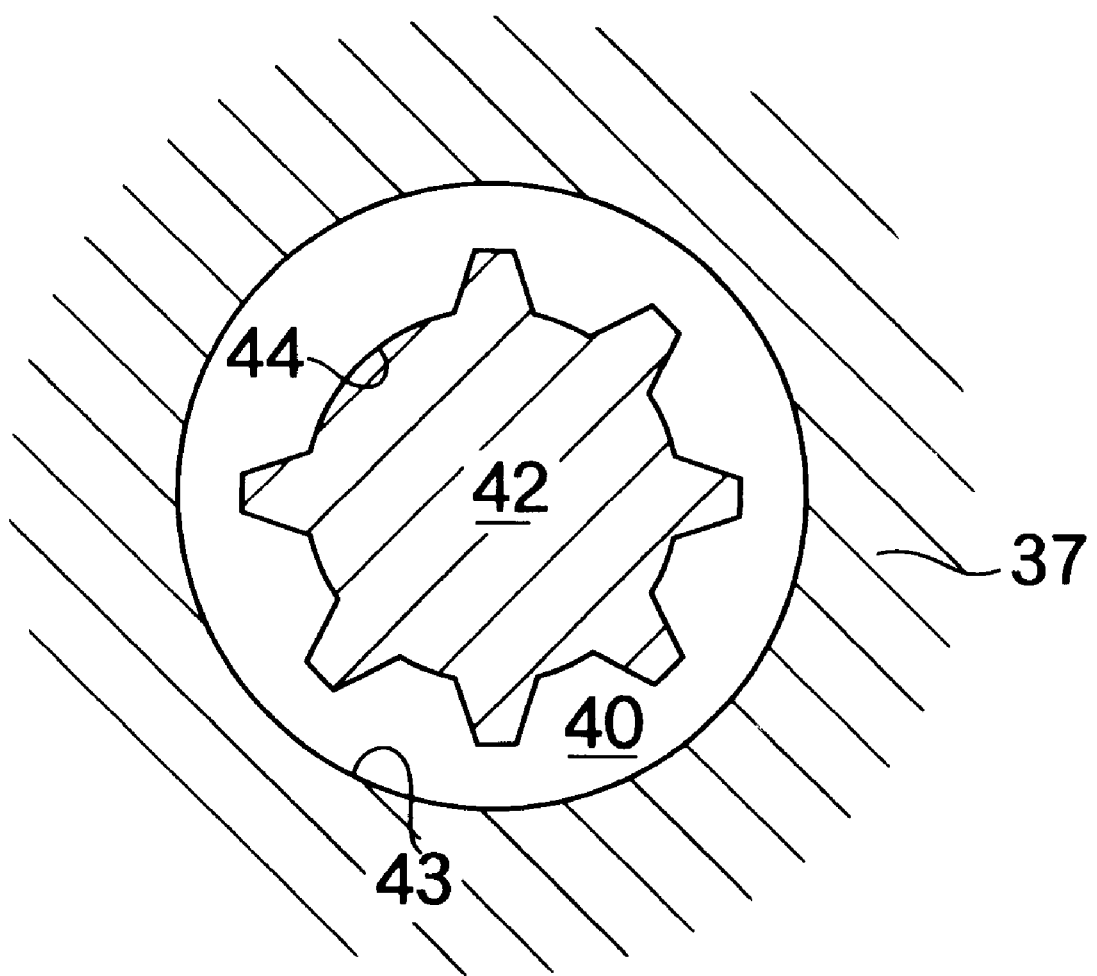
FIG. 5 is an enlarged sectional view taken along a line 5—5 in FIG. 4.

FIGS. 1 to 5 illustrate a first embodiment of the present invention. FIG. 1 is a perspective view of the entire arrangement of a steering device for a vehicle; FIG. 2 is an enlarged sectional view taken along a line 2—2 in FIG. 1; FIG. 3 is an enlarged sectional view taken along a line 3—3 in FIG. 1; FIG. 4 is an enlarged sectional view taken along a line 4—4 in FIG. 1; and FIG. 5 is an enlarged sectional view taken along a line 5—5 in FIG. 4.

As shown in FIG. 1, a driving pulley housing 2 mounted in front of a steering wheel 1 of an automobile and a follower pulley housing 4 mounted on a gear box 3 are connected to each other by two first Bowden wires 5 and 6, an intermediate interlocking means 7, and two second Bowden wires 5' and 6'. Tie rods $8_L$ and $8_R$ extending laterally of a vehicle body from opposite ends of the gear box 3 are connected to knuckles (not shown) which support left and right wheels $W_L$ and $W_R$. An electronic control unit U is mounted between the driving pulley housing 2 and the gear box 3.

As shown in FIG. 2, a driving pulley 13 is fixed to a rotary shaft 12 which is rotatably supported in the driving pulley housing 2 and rotated along with the steering wheel 1. The first Bowden wire 5 includes an outer tube 5o, and an inner cable 5i slidably accommodated within the outer tube 5o. Likewise, the first Bowden wire 6 includes an outer tube 6o, and an inner cable 6i slidably accommodated within the outer tube 6o.

One end of each of the inner cables 5i and 6i is wound around and fixed in a helical pulley groove defined around an outer periphery of the driving pulley 13. One end of each of the outer tubes 5o and 6o is respectively passed through two cable insert bores $2_1$ and $2_2$ defined in the driving pulley housing 2 and respectively has flange portions $5_1$ and $6_1$ fixed to an inner surface of the driving pulley housing 2.

As shown in FIG. 3, the gear box 3 is divided into a left motor accommodating chamber 18, and a right rack and pinion accommodating chamber 19, and the follower pulley housing 4 is supported on the rack and pinion accommodating chamber 19. A rotary shaft 21 integral with a follower pulley 20 mounted in the follower pulley housing 4 extends into the rack and pinion accommodating chamber 19, and a pinion 22 is fixed to the extension of the rotary shaft 21. A steering rod 23 is slidably supported in the gear box 3 and connected at its opposite ends to the tie rods $8_L$ and $8_R$, and the pinion 22 is meshed with a rack 24 formed on the steering rod 23.

The other end of each of the inner cables 5i and 6I in the two second Bowden wires 5', 6' is wound around and fixed to the outer periphery of the follower pulley 20 and the other end of each of the outer tubes 5o and 6o is fixed to desired portions of the follower pulley housing 4.

A motor 25 for a power-steering operation is accommodated in the motor accommodating chamber 18 in the gear box 3 and includes a stator 26 secured to an inner peripheral surface of the motor accommodating chamber 18, a motor output shaft 30 rotatably supported on the inner peripheral surface of the motor accommodating chamber 18 through three ball bearings 27, 28 and 29, and fitted over an outer periphery of the steering rod 23, and a rotor 31 secured to the motor output shaft 30 and opposed to the stator 26. A ball screw mechanism 32 is interposed between an inner peripheral surface of the motor output shaft 30 and an outer peripheral surface of the steering rod 23, so that a steerage assisting force for laterally reciprocating the steering rod 23 can be generated by driving the motor 25 to rotate the motor output shaft 30 in opposite directions.

As shown in FIGS. 4 and 5, the intermediate interlocking means 7 includes a first housing 36 and a second housing 37 which are integrally coupled to each other with a partition wall 35 of the vehicle body such as a dash board lower member interposed therebetween. An intermediate follower pulley 38 is rotatably supported in the first housing 36 by a first rotary shaft 39, and an intermediate driving pulley 40 having the same diameter as the intermediate follower pulley 38 is rotatably supported in the second housing 37 by a second rotary shaft 41.

The intermediate follower pulley 38 includes a tapered spline shaft 42 on a side opposite from the first rotary shaft 39. The spline shaft 42 is passed through a through-hole 43 defined in the first housing 36, the partition wall 35 and the second housing 37 to engage a spline bore 44 defined in a side of the intermediate driving pulley 40 opposite from the second rotary shaft 41. Thus, the intermediate follower pulley 38 and the intermediate driving pulley 40 are coaxially coupled to each other and rotated in unison with each other. As can be seen from FIG. 5, spline teeth of the spline shaft 42 and the spline bore 44 are circumferentially non-symmetric with each other due to the lack of teeth and hence, the intermediate follower pulley 38 and the intermediate driving pulley 40 are coupled to each other necessarily at a fixed phase.

Each of the first Bowden wires 5 and 6 respectively includes outer tubes 5o, 6o fixed to the first housing 36, and inner cables 5i, 6i which are wound at the other end around and fixed to an outer periphery of the intermediate follower pulley 38 within the first housing 36. Likewise, each of the second Bowden wires 5' and 6' respectively includes outer tubes 5o, 6o fixed to the second housing 37, and inner cables 5i, 6i which are wound at the other end around and fixed to an outer periphery of the intermediate driving pulley 40 within the second housing 37.

The operation of the embodiment of the present invention having the above-described arrangement will be described below.

When the steering wheel 1 is rotated, for example, to turn the vehicle, the rotary shaft 12 is rotated along with the driving pulley 13 in FIG. 2, so that the inner cable 5i of the first Bowden wire 5 is pulled, while the inner cable 6i of the first Bowden wire 6 is loosened. As a result, the intermediate follower pulley 38 of the intermediate interlocking means 4 is rotated in FIG. 4, and such rotation is transmitted through the spline shaft 42 and the spline bore 44 to the intermediate driving pulley 40. The rotation of the intermediate driving pulley 40 is transmitted through the second Bowden wires 5' and 6' to the follower pulley 20 on the gear box 3, so that the pinion 22 integral with the rotary shaft 21 is rotated in FIG. 3, thereby causing a steering torque to be transmitted to the rack 24.

When the steering torque of the steering wheel 1 is detected by a detecting means (not shown), a detection value of the steering torque is subjected to a calculation along with other control signals in the electronic control unit U, and the motor 25 for the power-steering operation is driven based on the result of such calculation. Thus, the steering rod 23 is driven laterally by the motor 25 for the power-steering operation, thereby assisting the operation of the steering wheel 1 provided by a driver.

Since the steering wheel 1 and the gear box 3 are connected to each other by the flexible first Bowden wires 5 and 6 and second Bowden wires 5' and 6', as described above, the steering wheel 1 can be disposed at any position relative to the gear box 3, leading to considerably increased degree of design freedom. Thus, for example, the gear box 3 can be commonly used in a right-hand steered vehicle and in a left-hand steering vehicle, and the structures of a tilt mechanism and telescopic mechanism for the steering wheel 1 can be simplified.

A conventional steering shaft connecting the steering wheel 1 and the gear box 3 is not used and hence, it is difficult to transmit the vibration of the gear box 3 and the vibration of an engine to the steering wheel 1, thereby providing an enhanced riding comfort, but also ensuring a sufficient space around driver's feet to provide an enhanced residence. Moreover, during a collision of the vehicle, the steering wheel 1 can be moved forwards of the vehicle body at a sufficient stroke and hence, a large shock absorbing effect can be exhibited.

Further, the first and second housings 36 and 37 of the intermediate interlocking means 7 are capable of being coupled to and separated from each other with the partition wall 35 interposed therebetween. Therefore, the connection of the steering wheel 1 with the gear box 3 is completed only by coupling the first housing 36 having the intermediate follower pulley 38 with the first Bowden wires 5 and 6 previously assembled thereto being accommodated therein, to the second housing 37 having the intermediate driving pulley 40 with the second Bowden wires 5' and 6' previously assembled thereto being accommodated therein, so that the partition wall 35 is interposed between the first and second housings 36 and 37. This leads to a substantially enhanced workability. Moreover, in this case, the phase of coupling of the intermediate follower pulley 38 and the intermediate driving pulley 40 to each other is maintained constant by the spline shaft 42 and the spline bore 44 and hence, the neutral position of the steering wheel 1 and the neutral position of the gear box 3 cannot be mismatched from each other.

Figure 6:
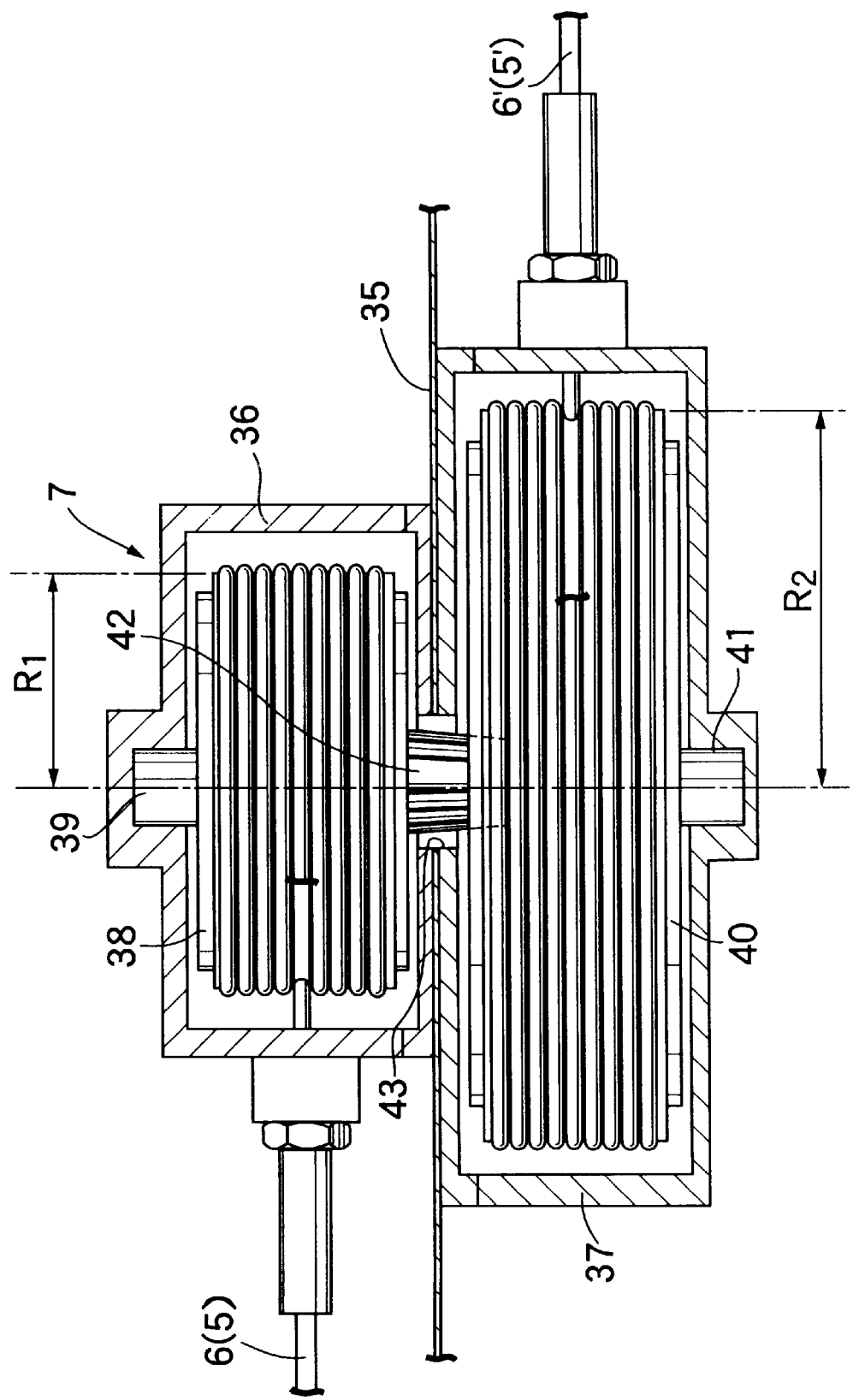
FIG. 6 is a sectional view of a second preferred embodiment of the present invention.

A second embodiment of the present invention will now be described with reference to FIG. 6.

In the second embodiment, the effective radius $R_2$ of the intermediate driving pulley 40 is set at a value larger than the effective radius $R_1$ of the intermediate follower pulley 38. Thus, the displacement of the first Bowden wires 5 and 6 is increased with a ratio of $R_2/R_1$ and transmitted to the second Bowden wires 5' and 6' and hence, the amount of gear box 3 operated relative to the amount of steering wheel 1 operated can be amplified. Of course, if required, the effective radius $R_2$ of the intermediate driving pulley 40 may be set at a value smaller than the effective radius $R_1$ of the intermediate follower pulley 38.

Figure 7:
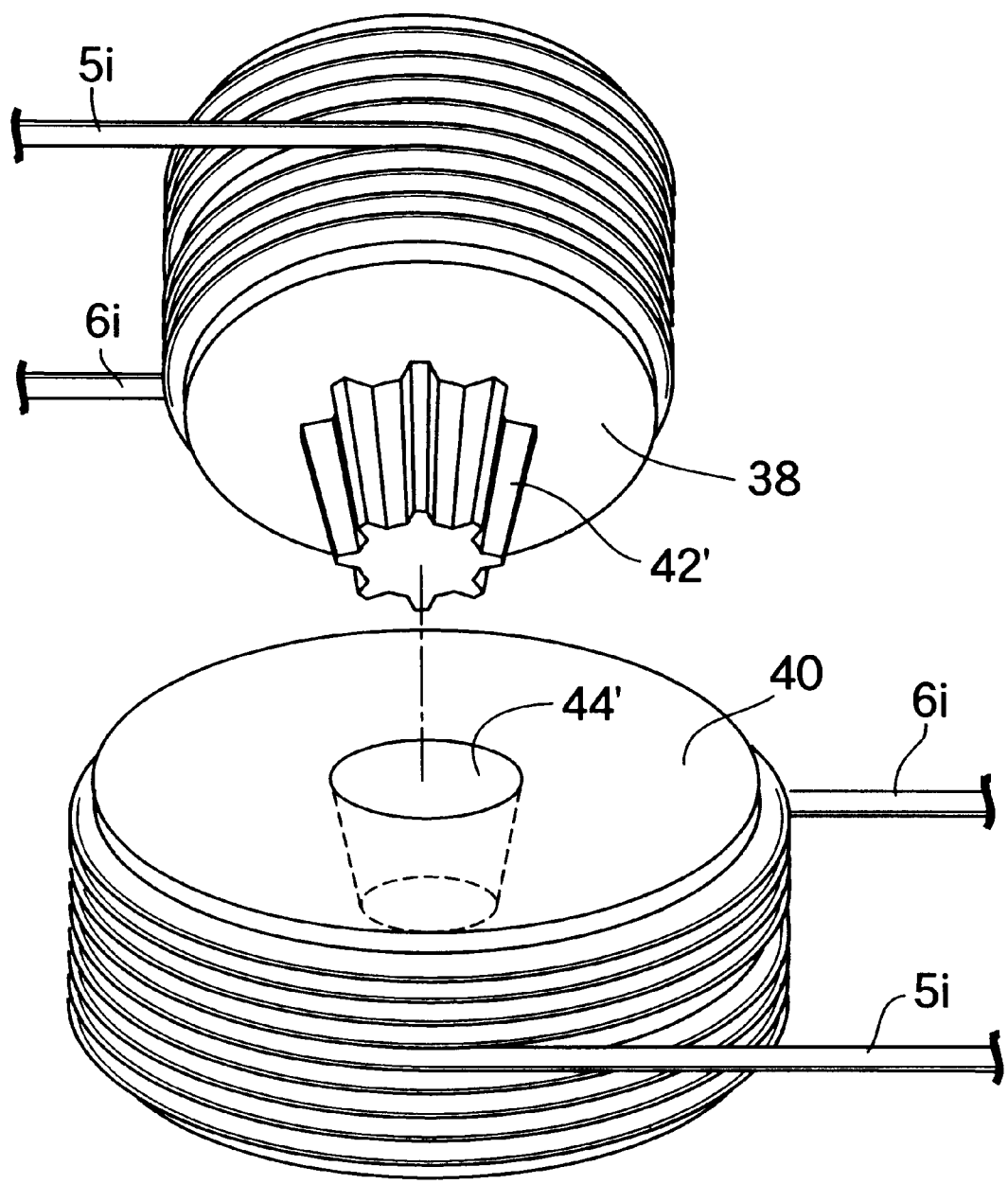
FIG. 7 is a view illustrating coupled portions of an intermediate follower pulley and an intermediate driving pulley according to a third preferred embodiment of the present invention.

A third embodiment of the present invention will be described with reference to FIG. 7.

In the third embodiment, the intermediate follower pulley 38 includes a tapered spline 42' made of metal, and the intermediate driving pulley 40 includes a spline bore 44' made of a resin and having no spline tooth. If the heated spline shaft 42' is press-fitted into the spline bore 44' in a state in which the steering wheel 1 and the gear box 3 have been located at their respective neutral positions, the spline bore 44' is molten and coupled to the spline shaft 42. If the construction is such that the intermediate follower pulley 38 and the intermediate driving pulley 40 can be coupled to each other at any phase, the neutral position of the steering wheel 1 and the neutral position of the gear box 3 can be finely regulated so that they can be matched with each other.

Figure 8:
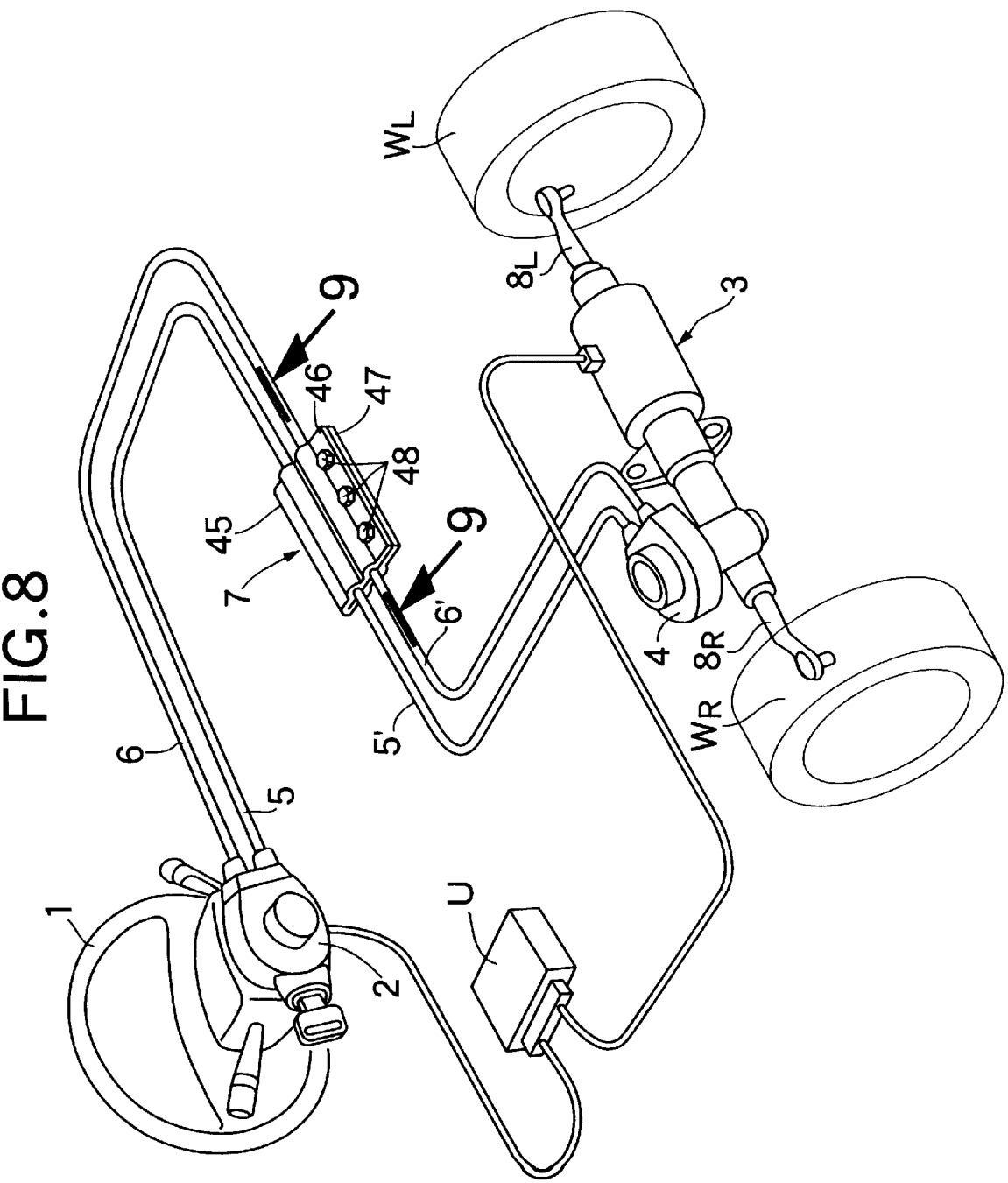
FIG. 8 is a perspective view of the entire arrangement of a steering device for a vehicle according to a fourth preferred embodiment of the present invention.

A fourth embodiment of the present invention will be described with reference to FIGS. 8 and 9.

The fourth embodiment is different from the first embodiment with respect to the structure of the intermediate interlocking means 7. The intermediate interlocking means 7 in the fourth embodiment includes a first holder 46 and a second holder 47 which are openably and closably connected to each other by a hinge 45 as shown in FIG. 8. The holders 46 and 47 are fixed in their closed states by three bolts 48.

As can be seen from FIG. 9, an elongated groove 49, circular in section, for connecting the first Bowden wire 6 and the second Bowden wire 6' is defined between the holders 46 and 47. A pair of annular grooves $49_1$, $49_1$ are defined in vicinity of opposite ends of the elongated groove 49, and flange portions $6_2$, $6_2$ of the outer tubes 6o, 6o of the first and second Bowden wires 6 and 6' are detachably fitted into the annular grooves $49_1$, $49_1$, respectively. A slider 50 is slidably accommodated in a central portion of the elongated groove 49, and ends of the inner cables 6i, 6i of the first and second Bowden wires 6 and 6' are detachably coupled to the slider 50. The other first and second Bowden wires 5 and 5' are also coupled within the intermediate interlocking means 7 with the same structure as the first and second Bowden wires 6 and 6'.

According to the fourth embodiment, the first Bowden wires 5 and 6 and the second Bowden wires 5' and 6' can be easily connected or disconnected by removing the bolts 48 and opening the first and second holders 46 and 47 about the hinge 45.

Although the embodiments of the present invention have been described in detail, it will be understood that the present invention is not limited to the above-described embodiments, and various modifications in design may be made without departing from the spirit and scope of the invention defined in claims.

For example, in the embodiments, the driving pulley 13 and the follower pulley 20 are employed as the wire driving means and the wire follower means, and the intermediate follower pulley 38 and the intermediate driving pulley 40 are employed as the intermediate wire follower means and the intermediate wire driving means. In place of these pulleys 13, 20, 38 and 40, arms may be employed which are secured at their central portions to the rotary shafts 12 and 21 and connected at their opposite ends to the inner cables 5i and 6i of the Bowden wires 5 and 6. In the first and second embodiments, the circumferentially non-symmetric splines are used to couple the intermediate follower pulley 38 and the intermediate driving pulley 40 at the fixed phase, but keys and key grooves, or square shafts and square bores may be used and even in this case, similar function and effect can be obtained.

As discussed above, according to one aspect of the present invention, the first wires connected at their one ends to the wire driving means and the second wires connected at their one ends to the wire follower means are connected at their other ends to each other through the intermediate interlocking means which is mounted between the steering wheel and the gear box. Therefore, the assembly of the first and second wires can be carried out separately on the side of the steering wheel and on the side of the gear box. Even in the case where the partition wall exists between the steering wheel and the gear box, the assembly can be performed with a hindrance, leading to an enhanced manufacture.

According to a second aspect of the present invention, the intermediate interlocking means includes the intermediate wire follower means and the intermediate wire driving means which are capable of being coupled to and separated from each other, and the other end of each of the first wires is connected to the intermediate wire follower means, while the other end of each of the second wires is connected to the intermediate wire driving means. Therefore, if the other end of each of the first wires is previously connected to the intermediate wire follower means and the other end of each of the second wires is previously connected to the intermediate wire driving means, the driving force transmitting system can be established between the steering wheel and the gear box merely by integrally coupling the intermediate wire follower means and the intermediate wire driving means to each other, leading to a further enhanced assembly.

According to a third aspect of the present invention, the steering device includes the coupling means for coupling the intermediate wire follower means and the intermediate wire driving means to each other at the fixed phase. Thus, in coupling the intermediate wire follower means and the intermediate wire driving means to each other, the neutral position of the steering wheel and the neutral position of the gear box can be prevented from being mismatched from each other.

According to a fourth aspect of the present invention, the steering device includes the coupling means for coupling the intermediate wire follower means and the intermediate wire driving means to each other at any phase. Thus, in coupling the intermediate wire follower means and the intermediate wire driving means, the neutral positions of the steering wheel and the gear box can be finely regulated so that they are matched with each other.

According to a fifth aspect of the present invention, the effective radius of the intermediate wire follower means from its rotational center to the first wires is different from the effective radius of the intermediate wire driving means from its rotational center to the second wires. Therefore, the amount of gear box operated relative to the amount of steering wheel operated can be set at any value.

What is claimed is:

1. A cable-type steering device comprising:

a wire driving device connected to a steering wheel;

a wire follower device connected to a gear box to steer vehicle wheels;

first wires connected to one end to said wire driving device;

second wires connected at one end to said wire follower device; and an intermediate interlocking device, disposed between the steering wheel and the gear box, including an intermediate wire follower device and an intermediate wire driving device which are capable of being coupled to and separated from each other, another end of each of the first wires being connected to said intermediate wire follower device, and another end of each of the second wires being connected to said intermediate wire driving device.

2. A cable-type steering device as recited in claim 1, further including coupling means for coupling said intermediate wire follower device and said intermediate wire driving device to each other at a fixed phase.

3. A cable-type steering device as recited in claim 1, further including coupling means for coupling said intermediate wire follower means and said intermediate wire driving means to each other at any phase.

4. A cable-type steering device according to claim 1, wherein an effective radius of said intermediate wire follower device from a rotational center thereof to said first wires is different from an effective radius of said intermediate wire driving device from a rotational center thereof to the second wires.

5. A cable-type steering device, comprising:

a wire driving pulley connected to a steering wheel;

a wire follower pulley connected to a gear box to steer vehicle wheels;

first wires wound around and connected at one end to said wire driving pulley;

second wires wound around and connected at one end to said wire follower pulley;

an intermediate wire follower pulley, said first wires being wound around and connected at another end to said intermediate wire follower pulley;

an intermediate wire driving pulley, said second wires being wound around and connected at another end to said intermediate wire driving pulley; and a partition wall separating said intermediate wire follower pulley and said intermediate wire driving pulley and having a through-hole through which said intermediate wire follower pulley is coaxially spline-coupled to said intermediate wire driving pulley.

6. A cable-type steering device as recited in claim 5, wherein said intermediate wire driving pulley has a spline bore disposed in a side surface thereof, and wherein said intermediate wire follower pulley has a spline shaft protruding from a side surface thereof and extending through said through-hole of said partition wall into said spline bore of said intermediate wire driving pulley.

7. A cable-type steering device as recited in claim 5, wherein said intermediate wire driving pulley has a spline bore disposed in a side surface thereof, and wherein said intermediate wire follower pulley has a circumferentially non-symetric spline shaft protruding from a side surface thereof and extending through said through-hole of said partition wall into said spline bore of said intermediate wire driving pulley to couple said intermediate wire follower pulley and said intermediate wire driving pulley at a fixed phase.

8. A cable-type steering device as recited in claim 5, wherein said intermediate wire pulley has a spline bore, made of a resin and having no spline teeth, disposed in a side surface thereof, and wherein said intermediate wire follower pulley has a spline shaft protruding from a side surface thereof, extending through said through-hole of said partition wall, and press-fitted into said spline bore of said intermediate wire driving pulley to couple said intermediate wire follower pulley and said intermediate wire driving pulley at any phase.

9. A cable-type steering device as recited in claim 5, wherein said intermediate wire follower pulley has a first radius, and wherein said intermediate wire driving pulley has a second radius larger than said first radius.

10. A cable-type steering device, comprising:

a wire driving pulley connected to a steering wheel;

a wire follower pulley connected to a gear box to steer vehicle wheels;

first wires wound around and connected at one end to said wire driving pulley;

second wires wound around and connected at one end to said wire follower pulley; and an intermediate interlocking device having an elongated groove securing other ends of said first and second wires and a slider coupling together the other ends of said first and second wires.

* * * * *